United States Patent

Sakato et al.

Patent Number: 4,496,506
Date of Patent: Jan. 29, 1985

[54] METHOD FOR SHAPING GREEN BODY OF CERAMIC POWDER AND CERAMIC BODY OBTAINED BY FIRING SAME

[75] Inventors: Naoyuki Sakato, Saitama; Tetsuo Kitagaki, Kanagawa, both of Japan

[73] Assignee: Shin-Etsu Chemical Co., Ltd., Tokyo, Japan

[21] Appl. No.: 412,960

[22] Filed: Aug. 30, 1982

[30] Foreign Application Priority Data

Sep. 1, 1981 [JP] Japan ................................. 56-137250

[51] Int. Cl.$^3$ ............................................. C04B 35/64
[52] U.S. Cl. ........................................ 264/109; 264/63
[58] Field of Search ................................... 264/63, 109

[56] References Cited

U.S. PATENT DOCUMENTS

| | | | |
|---|---|---|---|
| 3,953,562 | 4/1976 | Hait et al. | 264/63 |
| 4,001,364 | 1/1977 | Suzuki | 264/63 |
| 4,020,134 | 4/1977 | Gordon et al. | 264/63 |
| 4,108,929 | 8/1978 | Prochazka et al. | 264/63 |

Primary Examiner—James Derrington
Attorney, Agent, or Firm—Hopgood, Calimafde, Kalil, Blaustein & Judlowe

[57] ABSTRACT

The invention provides a novel method for shaping a green body of a ceramic powder by use of a specific organic binder, which is a modified polyvinyl alcohol comprising monomeric units expressed by the formula

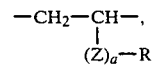

in which R is a monovalent hydrocarbon group having at least 4 carbon atoms, Z is a divalent linking unit of —O— or —O—CO— and a is zero or 1, in a limited mole fraction, Due to the strong binding power and lubricity of the binder polymer, the wet blend of ceramic powder with an aqueous solution of the binder has good workability in shaping and the wet shaped body has good shape retainability. The shaped body after drying also has excellent mechanical strength to facilitate handling.

6 Claims, No Drawings

METHOD FOR SHAPING GREEN BODY OF CERAMIC POWDER AND CERAMIC BODY OBTAINED BY FIRING SAME

BACKGROUND OF THE INVENTION

The present invention relates to a method for shaping a green body of ceramic powder or, more particularly, to a method for shaping a green body of ceramic powder by use of a novel binder capable of giving improved mechanical strengths and shape retainability of the green body before firing as well as high smoothness of the surface thereof and also relates to a ceramic body obtained by firing the green body.

As is well known, so-called ceramics in the general categorization include an extremely wide diversity of materials in the types of materials as well as in the uses of the products. Irrespective of the type of the material, most of the ceramic products are manufactured according to the principle that a shaped body called a green body is first shaped of a powder of the ceramic material and then the green body is fired to cause sintering of the particles of the ceramic powder. When the ceramic powder is selected, in particular, from various kinds of ferrites, titanates, alumina, cordierite, titanium dioxide, silicon carbide, silicon nitride and the like, problems are encountered in the insufficient workability of the ceramic powder in shaping and mechanical strengths and shape retainabililty of the green body so that it is a usual practice that the ceramic powder is blended with an organic binder with an object to improve the above mentioned properties.

The method for shaping a green body of the blend of the ceramic powder and the binder can be roughly classified into the wet process and the dry process practiced according to the kind of the binder and the type of the desired ceramic product. The binder suitable for the wet process is exemplified by methyl cellulose, carboxymethyl cellulose, starch and the like, among which methyl cellulose is used most widely. On the other hand, the dry process is undertaken by use of a binder such as polyvinyl alcohol, methyl cellulose, carboxymethyl cellulose, sodium alginate and the like, among which polyvinyl alcohol is preferred in the modern technology of ceramics.

When ceramic green bodies are shaped by extrusion molding in the wet process, metyl celluloses or carboxymethyl celluloses giving an aqueous solution of high viscosity are preferred as the binder from the standpoint of obtaining good shape retainability of the wet green body after extrusion although there is a problem of the insufficient mechanical strengths of the dried shaped body before firing. This problem is more serious when starch is used as the binder. When polyvinyl alcohols are used as the binder, considerable improvements can be obtained in the mechanical strengths of the dried green body but the shape retainability of the wet green body is poor because polyvinyl alcohols usually give an aqueous solution of relatively low viscosity. In addition, the surface of the extruded body is not always in good condition.

Alternatively, there has been proposed a method of shaping a green body of ceramic powder by extrusion using a non-aqueous solvent as the binding medium in place of water. Such a method of using an organic solvent is, however, disadvantageous and has no general applicability due to the problems of safety and environmental pollution as well as the increased costs in contradiction of the requirement of material saving. In the method of tape shaping as a modification of the wet process shaping of ceramic green bodies in a tape-like form, polyvinyl butyrals having relatively large binding power are sometimes used as a solution in an organic solvent though, naturally, not without the above mentioned problems inherent to the use of organic solvents.

In the dry process shaping of ceramic green bodies, the ceramic powder with the solution of a binder is spray-dried into beads or granules in which, as is mentioned above, polyvinyl alcohols are used usually as the binder. When a polyvinyl alcohol of a relatively large degree of polymerization is used as the binder in order to obtain a sufficient binding power, the slurry of the ceramic powder with the binder solution has poor sprayability and no uniform particle size distribution is obtained of the resultant ceramic granules. This defect can be mitigated by the use of a polyvinyl alcohol of a relatively low degree of polymerization though with sacrifice of the binding power. Methyl celluloses and carboxymethyl celluloses are still more unsuitable as the binder in the ceramic slurry to be dried by spraying due to the excessively high viscosity or consistency of the slurry despite the binding power thereof not always satisfactorily high.

Thus, any one of the conventional binders used for shaping ceramic green bodies has its own merits and demerits and is not satisfactory in all respects so that development of a ceramic binder having improved performance is eagerly desired in the technology of ceramics.

SUMMARY OF THE INVENTION

It is therefore an object of the present invention to provide a novel and improved method for shaping a green body of ceramic powder without the above described problems in the prior art due to the inadequate performance of the ceramic binder both in the wet and dry processes.

Another object of the present invention is to provide a novel ceramic binder suitable for shaping a green body of ceramic powder in both of the wet and dry processes as being freed from the problems and disadvantages unavoidable in the conventional ceramic binders.

Thus, the method of the present invention for shaping a green body of ceramic powder, established as a result of the extensive investigations undertaken by the inventors, comprises:

admixing 100 parts by weight of a ceramic powder with an aqueous solution containing from 0.1 to 10 parts by weight of, as a binder, a modified polyvinyl alcohol substantially composed of the monomeric units expressed by the formulas

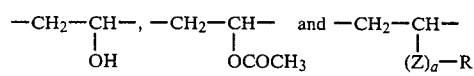

in mole fractions x, y and z, respectively, in which R is a monovalent hydrocarbon group having at least 4 carbon atoms, Z is a divalent linking unit which is either —O— or —O—CO—, a is a number of zero or 1 and y and z have values of zero or a positive number not exceeding 0.3 for y and a positive number in the range from 0.0001 to 0.1 for z with the proviso that x+y+z is equal to 1, to give a blend wet with the aqueous solution;

shaping the wet blend into a formed body; and drying the thus shaped formed body.

According to the above definition, the modified polyvinyl alcohol as the binder is essentially composed of the two kinds of the monomeric units expressed by the first and third formulas, optionally, together with the units expressed by the second formula. The units expressed by the third formula exhibiting hydrophobic nature are characteristic in the modified polyvinyl alcohol used in the invention and can be introduced into the polymer molecule by the copolymerization of vinyl acetate and a comonomer, which may be a 1-alkene expressed by the formula $CH_2=CH-R$, an alkyl vinyl ether expressed by the formula $CH_2=CH-O-R$ or a vinyl carboxylate expressed by the formula $CH_2=CH-O-CO-R$, the meaning of R being the same as above defined, followed by at least partial saponification to convert the vinyl acetate units into the vinyl alcohol units of the first formula.

DETAILED DESCRIPTION OF THE PREFERRED EMBODIMENTS

As is mentioned above, one of the most important characteristics required for a ceramic binder is the power to impart good shape retainability to the wet shaped body formed by extrusion in the wet process method. In this connection, the above described modified polyvinyl alcohol is quite satisfactory and capable of imparting good shape retainability to the wet shaped body by virtue of the high viscosity of the aqueous solution of the polymer. In addition, extrusion of the ceramic powder blend prepared with the modified polyvinyl alcohol can be performed very smoothly in an extruder and the surface of the extruded shaped body has satisfactory smoothness owing to the lubricative effect exhibited by the hydrophobic groups in the polymeric structure. Furthermore, the mechanical strength of the shaped green body after drying is excellent when the modified polyvinyl alcohol is used as the binder since the adhesion and the binding power of the modified polyvinyl alcohol are strong enough as in the ordinary unmodified polyvinyl alcohols. The method of tape shaping can also be performed with an aqueous ceramic blend prepared by use of the modified polyvinyl alcohol by suitably selecting the degrees of saponification and polymerization of the modified polyvinyl alcohol so as to obtain sufficient binding power.

Turning now to the application of the modified polyvinyl alcohol to the dry process shaping method of ceramics, the sprayability of the ceramic slurry prepared with addition of the modified polyvinyl alcohol is better than with a conventional polyvinyl alcohol due to the smaller trailing of an aqueous solution of the modified polyvinyl alcohol in spraying. In addition, the modified polyvinyl alcohol has larger binding power than conventional polyvinyl alcohols so that the amount of the binder in the ceramic slurry can be considerably decreased.

As is defined before, the modified polyvinyl alcohol used in the inventive method necessarily contains the hydrophobic monomeric units expressed by the third formula having a monovalent hydrocarbon group denoted by R in the side chain in a mole fraction of 0.0001 to 0.1 or, in other words, 0.01 to 10% by moles based on the total number of the monomeric units. The group R is a monovalent hydrocarbon group having at least 4 carbon atoms. The group R is preferably aliphatic. When the number of carbon atoms in the group R is 3 or smaller or when the mole fraction of the hydrophobic monomeric units is smaller than 0.0001, the desired effects by the use of the modified polyvinyl alcohol can no longer be obtained and the results are much the same as in the use of the conventional unmodified polyvinyl alcohols. When the mole fraction of the hydrophobic monomeric units is larger than 0.1 in the modified polyvinyl alcohol, such a polymer is poorly soluble in water so that the aqueous solution containing the polymer can hardly be prepared.

The modified polyvinyl alcohol containing the hydrophobic monomeric units with the group $-(Z)_a-R$ in the side chain can be prepared by the copolymerization of vinyl acetate and a comonomer expressed by the formula $CH_2=CH-(Z)_a-R$, the meanings of the symbols Z, a and R being the same as defined before, to give a copolymer composed of two kinds of the monomeric units expressed by the second and the third formulas followed by at least partial saponification of the monomeric units derived from vinyl acetate into the vinyl alcohol units expressed by the first formula.

Suitable comonomers include three classes according to the type of the divalent linking unit Z, which may be $-O-$ or $-O-CO-$, and the value of a, which may be zero or 1. The first class is a vinyl alkyl ether expressed by the formula $CH_2=CH-O-R$ exemplified by hexyl vinyl ether, octyl vinyl ether, lauryl vinyl ether, cetyl vinyl ether, stearyl vinyl ether and the like. The second class is a vinyl ester of a straight-chain or branched-chain carboxylic acid expressed by the formula $CH_2=CH-O-CO-R$ exemplified by vinyl laurate, vinyl stearate and the like as the examples of the esters of straight-chain carboxylic acids and vinyl esters of a branched-chain carboxylic acid of which the group R has 9 to 11 carbon atoms sold under the tradename of VeoVa as the examples of the esters of branched-chain carboxylic acids. Further, the comonomers belonging to the third class are 1-alkenes expressed by the formula $CH_2=CH-R$ exemplified by 1-hexene, 1-octene, 1-decene, 1-dodecene, 1-hexadecene, 1-octadecene and the like.

The monovalent hydrocarbon group denoted by R in the above named comonomers should preferably contain at least 8 carbon atoms. In such a case, the mole fraction of the hydrophobic monomeric units derived from the above comonomers should be in the range from 0.0001 to 0.05 in the modified polyvinyl alcohol.

The thus obtained copolymer is then saponified according to the conventional method to convert the acetyl groups into hydroxy groups. The reaction of saponification may not be complete but some of the acetyl groups may be left unsaponified. Depending on the desired application of the ceramics, in particular, in view of the better solubility of the polymer in water, partially saponified modified polyvinyl alcohols are sometimes preferred. However, the mole fraction y of the second monomeric units, i.e. the units having unsaponified acetyl groups, should not exceed 0.30 or, preferably, 0.25 in view of the rather decreased solubility of the polymer in water. It is optional that the monomeric units of which the modified polyvinyl alcohol is composed include units of the other types than the above mentioned three types in a small mole fraction such as the units derived from itaconic acid provided that the essential properties of the modified polyvinyl alcohol are not substantially influenced.

The types of the ceramic powders to be used in the inventive method by use of the modified polyvinyl alcohol as the binder are not particularly limitative including oxide-based ones such as alumina, silica, titanium dioxide, zirconia, cordierite, forsterite, titanates, ferrites and the like and non-oxide-based ones such as silicon carbide, silicon nitride and the like known in the art of ceramics.

The amount of the modified polyvinyl alcohol in the ceramic blend with the ceramic powder should be in the range from 0.1 to 10 parts by weight per 100 by weight of the ceramic powder. When the amount is smaller than above, no sufficient binding effect can be obtained as a matter of course while an excessively large amount of the binder is detrimental on the quality of the ceramic products obtained therewith. The modified polyvinyl alcohol is preferably dissolved in advance in water before being admixed with the ceramic powder. The concentration of this aqueous solution is determined according to the type of the process for shaping. It is optional that the blend of the ceramic powder and the binder solution is further admixed with known additives such as plasticizers, organic solvents, defoaming agents, lubricants and the like according to need.

Conventional procedures are applicable to the shaping of the thus prepared ceramic blend into a formed body and drying and firing of the thus shaped green body into finished ceramic products without particular limitations in the processing conditions. For example, various shaping methods known in the art are applicable according to the types of the desired ceramic products including extrusion molding, injection molding, tape shaping, compression molding, slip casting and the like. The application fields of the ceramic products manufactured according to the inventive method are widely diversified including dielectric materials, magnetic materials, piezoelectric elements, substrates for ICs, IC packages, electric insulators, catalyst carriers, heat insulating materials, corrosion-resistant materials, anti-abrasion materials and the like without particular limitations.

In the following, the method of the present invention is illustrated in further detail by way of examples.

In the following examples, several kinds of modified polyvinyl alcohols are used as the binder. They are characterized by the kind of the comonomer used in the copolymerization with vinyl acetate and the content of the comonomer in the monomer mixture in % by moles, the degree of saponification and the degree of polymerization shown in Table 1 below.

TABLE 1

| Modified polyvinyl alcohol | Copolymerization with vinyl acetate | | Degree of saponification, % | Degree of polymerization |
|---|---|---|---|---|
| | Comonomer(s) | % by moles in monomer mixture | | |
| MPVA-A | Stearyl vinyl ether | 0.5 | 99.1 | 1710 |
| MPVA-B | Stearyl vinyl ether | 0.5 | 88.2 | 1710 |
| MPVA-C | VeoVa | 3.0 | 97.4 | 1540 |
| | Itaconic acid | 2.0 | | |
| MPVA-D | Vinyl laurate | 1.0 | 90.3 | 1370 |
| MPVA-E | 1-Dodecene | 1.0 | 99.0 | 1430 |
| MPVA-F | Lauryl vinyl ether | 2.0 | 89.0 | 2420 |
| MPVA-G | VeoVa | 4.0 | 92.0 | 2030 |
| MPVA-H | Stearyl vinyl ether | 0.5 | 87.7 | 740 |
| MPVA-I | Stearyl vinyl ether | 0.5 | 98.4 | 740 |
| MPVA-J | Vinyl laurate | 0.8 | 88.2 | 1010 |

EXAMPLE 1

A mixture composed of 100 parts by weight of a powder of cobalt ferrite ($CoO.Fe_2O_3$) and 25 parts by weight of an aqueous solution containing 20% by weight of a binder selected from the modified polyvinyl alcohols MPVA—A to —E shown in Table 1 and 5% by weight of glycerin, the balance being water, was uniformly kneaded in a kneader and the thus kneaded mixture was extruded by use of an extruder of 16 mm diameter into a rod of 5 mm diameter. The shape retainability of the thus extruded wet rod was evaluated by visually examining the elastic recovery of the rod by bending. After drying at 150° C. for 1 hour, the rod in a suitable length was supported at two points with a span of 5 cm and loaded with a weight at the center position to determine the flexural strength.

Table 2 below summarizes the workability of the kneaded mixture in extrusion, the smoothness of the surface of the extruded rod, the shape retainability of the wet rod and the flexural strength of the dried rod.

For comparison, the same experimental procedure was repeated as above using, instead of the modified polyvinyl alcohols, either one of two conventional binders which was a commercially available methyl cellulose or polyvinyl alcohol (hereinafter called MC—A and PVA—A, respectively) specified below.

MC—A: Metolose 65SH-4000, a product by Shin-Etsu Chemical Co., Ltd.; contents of the methoxy and hydroxypropoxy groups 29.0 and 5.9% by weight, respectively PVA—A: Poval C-25, a product by the same manufacturer as above; degree of polymerization 2460 and degree of saponification 99.3%

The results obtained with these comparative binders are also shown in Table 2.

TABLE 2

| Experiment No. | Binder | Workability in extrusion | Smoothness of rod surface | Shape retainability | Flexural strength, kg/cm² |
|---|---|---|---|---|---|
| 1 | MPVA-A | Excellent | Excellent | Excellent | 160.5 |
| 2 | MPVA-B | Excellent | Excellent | Excellent | 125.7 |
| 3 | MPVA-C | Excellent | Excellent | Excellent | 141.8 |
| 4 | MPVA-D | Excellent | Excellent | Excellent | 144.1 |
| 5 | MPVA-E | Excellent | Excellent | Excellent | 150.9 |
| 6 | MC-A | Excellent | Good | Excellent | 67.0 |
| 7 | PVA-A | Good | Poor | Poor | 162.4 |

EXAMPLE 2

An aqueous slurry was prepared by blending 100 parts by weight of a powder of barium titanate, 50 parts by weight of an aqueous solution containing 12% by weight of a binder selected from the modified polyvinyl alcohols MPVA—B, —F and —G shown in Table 1 and 5% by weight of glycerin as the plasticizer, the balance being water, and an additional amount of 400 parts by weight of water and the slurry was cast on a belt in a thickness of 1.2 mm to be dried thereon (Experiments No. 8 to 10).

For comparison, the same experimental procedure as above was repeated excepting the use of each in the same amount of polyvinyl butyral, butyl phthalylbutyl glycolate and toluene in place of the modified polyvinyl alcohol, glycerin and water, respectively (Experiment No. 11).

In each of the above mentioned experiments, no sedimentation of the ceramic particles took place in the slurry. The dried tape-shaped green body obtained in each of the experiments had no cracks and pin-holes and was suitable for working by punching. Needless to say, the green body obtained in Experiment No. 11 had an unpleasant odor of toluene even after drying while the other green bodies had no odor.

EXAMPLE 3

An aqueous slurry was prepared by uniformly blending 100 parts by weight of a powder of alumina and 60 parts by weight of an aqueous solution containing 2.5% by weight (for Experiments Nos. 12, 13, 14, 16 and 17) or 5% by weight (for Experiments No. 15 and No. 17) of a binder which was either one of the modified polyvinyl alcohols MPVA—H to —J shown in Table 1 and conventional binders indicated below.

PVA—B: polyvinyl alcohol Poval C-17, a product by Shin-Etsu Chemical Co., Ltd.; degree of polmerization 1700 and degree of saponification 98.6%

PVA—C: polyvinyl alchol Poval PA-05, a product of the same manufacturer as above; degree of polymerization 530 and degree of saponification 88.1%

MC—B: methyl cellulose, Metolose 60SH-50, a product by the same manufacturer as above; contents of the methoxy and hydroxypropoxy groups 30.1 and 8.4% by weight, respectively Each of the above prepared slurries was dried into granules in a spray drier and a plate-like body of $10 \times 30$ mm wide and 2 mm thick was shaped with the dried granules by compression molding. The behavior of the slurry in the spray drying and the mechanical strength and appearance of the shaped body were examined to give the results shown in Table 3 below.

TABLE 3

| Experiment No. | Binder | Sprayability | Mechanical strength | Smoothness of surface |
|---|---|---|---|---|
| 12 | MPVA-H | Excellent | Excellent | Excellent |
| 13 | MPVA-I | Excellent | Excellent | Excellent |
| 14 | MPVA-J | Excellent | Excellent | Excellent |
| 15 | PVA-B | Fair* | Excellent | Excellent |
| 16 | PVA-B | Good | Poor | Fair |
| 17 | PVA-C | Excellent | Fair | Excellent |
| 18 | MC-B | Good | Poor | Excellent** |

*a little trailing of the slurry
**dirty spots on the surface

What is claimed is:

1. A method for shaping a green body of a ceramic powder which comprises:
admixing 100 parts by weight of a ceramic powder with an aqueous solution containing from 0.1 to 10 parts by weight of, as a binder, a modified polyvinyl alcohol substantially composed of the monomeric units expressed by the formulas

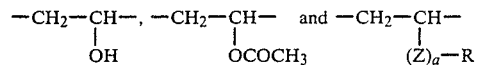

in mole fractions x, y and z, respectively, in which R is a monovalent hydrocarbon group having at least 4 carbon atoms, Z is a divalent linking unit which is either —O— or —O—CO—, a is a number of zero or 1, y is a positive number not exceeding 0.3 and z is a positive number in the range from 0.0001 to 0.1 with the proviso that $x+y+z$ is equal to 1, to give a blend wet with the aqueous solution, shaping the wet blend into a formed body, and drying the thus shaped formed body.

2. The method as claimed in claim 1 wherein the mole fraction y is a positive number not exceeding 0.25.

3. The method as claimed in claim 1 wherein the modified polyvinyl alcohol is an at least partially saponified product of a copolymer prepared by the copolymerization of vinyl acetate and a 1-alkene compound represented by the general formula $CH_2=CH-R$, in which R has the same meaning as defined above.

4. The method as claimed in claim 1 wherein the modified polyvinyl alcohol is an at least partially saponified product of a copolymer prepared by the copolymerization of vinyl acetate and an alkyl vinyl ether represented by the general formula $CH_2=CH-O-R$, in which R has the same meaning as defined above.

5. The method as claimed in claim 1 wherein the modified polyvinyl alcohol is an at least partially saponified product of a copolymer prepared by the copolymerization of vinyl acetate and a vinyl carboxylate represented by the general formula $CH_2=CH-O-CO-R$, in which R has the same meaning as defined above.

6. The method as claimed in claim 1 wherein the monovalent hydrocarbon group denoted by R has at least 8 carbon atoms and the mole fraction z has a value in the range from 0.0001 to 0.005.

* * * * *